United States Patent [19]
Vaughan et al.

[11] Patent Number: 5,702,148
[45] Date of Patent: Dec. 30, 1997

[54] EXTERIOR DECORATIVE SURROUND MOLDING MODULE

[75] Inventors: Robert A. Vaughan, Dearborn; Willard C. Christian, Lambertville; John P. Zimmer, Canton; James E. Mistopoulos, Saline, all of Mich.

[73] Assignee: The Standard Products Company, Cleveland, Ohio

[21] Appl. No.: 608,607

[22] Filed: Feb. 29, 1996

[51] Int. Cl.⁶ .................................................. B60J 10/02
[52] U.S. Cl. ........................ 296/146.9; 296/146.2; 296/201; 49/490.1; 49/502
[58] Field of Search ........................... 296/93, 146.2, 296/201, 146.9; 49/440, 490.1, 492.1, 502

[56] References Cited

U.S. PATENT DOCUMENTS

| | | | |
|---|---|---|---|
| 4,614,061 | 9/1986 | Brocke | 49/440 |
| 4,800,681 | 1/1989 | Skillen et al. | 49/440 |
| 5,001,867 | 3/1991 | Dupuy | 49/502 |
| 5,014,464 | 5/1991 | Dupuy et al. | 49/440 |
| 5,024,480 | 6/1991 | Petrelli | 296/146.9 |
| 5,042,200 | 8/1991 | Ugawa | 49/488 |
| 5,056,850 | 10/1991 | Katcherian et al. | 296/93 |
| 5,067,281 | 11/1991 | Dupuy | 49/502 |
| 5,168,668 | 12/1992 | Mishima et al. | 49/440 |
| 5,174,066 | 12/1992 | Dupuy | 49/502 |
| 5,356,194 | 10/1994 | Takeuchi | 296/146.9 |

Primary Examiner—Joseph D. Pape
Attorney, Agent, or Firm—Harness, Dickey & Pierce, P.L.C.

[57] ABSTRACT

Providing a module and a method of installing the module to a vehicle having a window opening for a translational glass pane supported and guided by a glass run channel. The module is comprised of a one-piece surround molding fully surrounding and generally defining the perimeter of the window opening. A glass run channel is secured to the surround molding. Fasteners are attached to the surround molding and attach the module to a flange on the vehicle. A belt line outer seal and one or more gimp seals may also be attached to more fully integrate the module. The module is fully assembled prior to being attached to a vehicle during final assembly, the surround molding supporting the glass run channel rather than having the glass run channel attached to a flange of the vehicle. Further, a method of installing the module in a reduced number of operations along the final assembly line is disclosed which provides improved control over the fit and finish of the multiple part within the module, and reduces labor time associated with the final assembly line.

24 Claims, 10 Drawing Sheets

EXTERIOR DECORATIVE SURROUND MOLDING MODULE

BACKGROUND OF THE INVENTION

The present invention relates generally to an exterior decorative surround molding for automotive windows and, more particularly, to a one-piece surround molding incorporating a glass run channel and an exterior belt line seal.

Conventionally, automotive window surround moldings are comprised of multiple pieces, and provide little or no structural support for sealing the window which they are associated with. Further, conventional sealing systems used with translational window panes in automobiles are directly attached to a weld flange associated with the window aperture, or to channels which are attached to the structure surrounding the window aperture prior to installation of the glass run. Glass run channels are used in automotive vehicles and the like to support window panes which translationally move between an open and a closed position. The glass run channel guides the window pane along the front and rear vertical edges during translational movement between the open and closed positions, and supports the window pane so as to form a seal between the window pane and the vehicle door or body structure. The seal is required to prevent the outside elements from entering the passenger compartment and contacting either the passenger or the interior of the vehicle. The structural integrity of the glass run channel must be sufficient to prevent the window pane from experiencing significant movement other than in the intended translational direction. The glass run channel must also allow the window pane translational movement without undue resistance.

Decorative moldings are often used in association with glass run channels to improve the appearance of the exterior edge of the glass run channel. Some moldings are attached to or molded into the exterior portion of the seal, while others are fastened to the structure of the door or body surrounding the window. Under either method the glass run channel is attached directly to the weld flange or to channels which are attached to the surrounding structure in an additional operation during final assembly. Generally, multiple operations are required to fasten the prior art glass run channel, belt weather strip, and decorative molding. Often the prior art decorative moldings are comprised of two or more pieces. For example one piece is attached along the belt line of the window opening, a second piece is attached along the B pillar, top of window, and A pillar areas of the window opening, and a third piece of molding is attached near the A pillar/Belt line junction where an exterior rear view mirror is often positioned. Further, even when the decorative molding is incorporated in the glass run channel by insert molding or alternate attachment methods) there are still multiple piece required for the belt line area, the B pillar/top of window/A pillar, and the mirror area. Each additional piece which must be assembled to the vehicle alone the final assembly line has a greater assembly cost associated with it then if the parts can be assembled into a larger sub-assembly remote from the final assembly line.

Another disadvantage of attaching multiple pieces to the vehicle, verses having a sub-assembly, is that the quality of the fit and finish of the pieces is less controlled. For example, the length of the weld flange around the entire window aperture must be controlled to provide a uniform appearance and proper sealing of the glass run channel and belt line seal if attached directly to the flange. There is an inherent cost associated with controlling this entire edge during stamping and forming. Also there is an additional cost associated with the tooling fixtures which are required during assembly of the door inner panel to the door outer panel to ensure that the weld flange is uniform. It is generally accepted within the industry that reducing the number or length of areas which have "critical" or "significant" dimensional characteristics reduces the cost of the component and provides a more robust design.

Therefore, one advantage of the present invention over the prior art is that the added step of attaching the glass run channel to the weld flange is not required. The decorative surround molding module is fully assembled prior to delivery to the final assembly line. Since the installation requires fewer operations, taking less time, and requiring less space along the assembly line, and since the cost of space is often lower in a sub-assembly area than alone the final assembly line, this advantage of the present invention can result in cost savings compared to the prior art methods.

A further advantage of the present invention is that only a few areas along the weld flange, as opposed to the entire length of the weld flange, must have "critical" or "significant" dimensional tolerances. The only areas that require dimensional control are at the attachment points where the decorative surround molding module is fastened to the flange. These attachment points may also be used as secondary locaters when aligning the door inner and door outer in an assembly fixture. Since the glass run channel and belt line seal are attached to the surround molding module itself the coordination between these parts can be more closely controlled then when assembled on the final assembly line.

SUMMARY OF THE INVENTION

The present invention relates to a decorative surround molding module for a vehicle having a window opening for a translational glass pane which is supported and guided by a glass run channel along its perimeter. The surround molding module is comprised of a one-piece surround molding generally defining the perimeter of the window opening. A glass run channel is secured to the surround molding. Fastening means are attached to the surround molding and are designed to attach the surround molding module to a flange on the vehicle. A belt line outer seal and one or more gimp seals may also be attached to the decorative surround molding module to more fully integrate the system.

It is an object of the present invention to provide a decorative surround molding module which is fully assembled prior to being attached to a vehicle during final assembly, the surround molding supporting the glass run channel rather than having the glass run channel attached to the weld flange prior to or after the surround molding is attached to the vehicle.

It is a further object of the present invention to provide a module which is easily installed during vehicle assembly, easily removable should service be required, and yet provides rigid support for the glass run channel, thereby providing proper sealing between the interior compartment of the vehicle and the exterior environment, and reducing the wind noise which is created as the vehicle travels at speed.

A further object of the present invention is to provide a method of installing a glass run channel and decorative surround molding in a reduced number of operations which is easy for the final assembly line operator, and requires less time than if the components were attached separately.

BRIEF DESCRIPTION OF THE DRAWINGS

Other objects and advantages of the present invention will become apparent upon reading the following detailed description, the appended claims, and upon reference to the drawings, in which:

DETAILED DESCRIPTION OF THE PRESENT INVENTION

Figure 1:
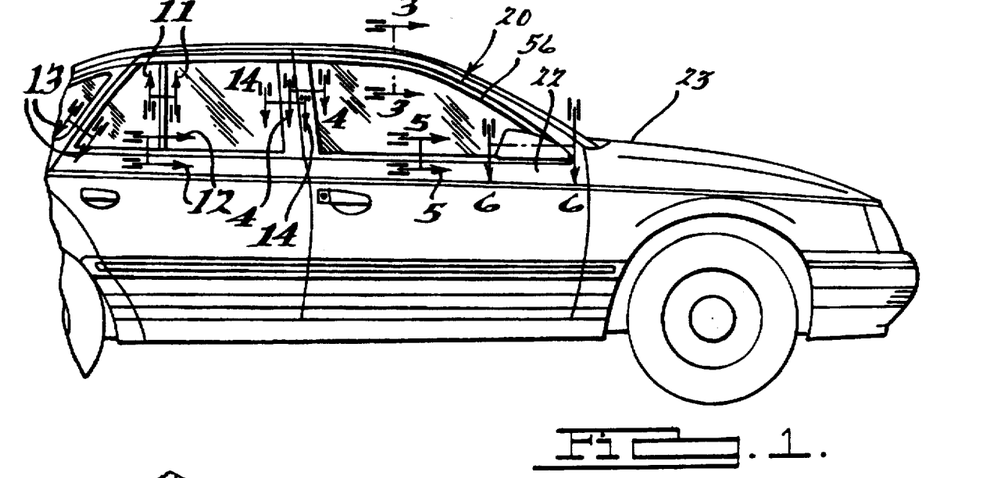
FIG. 1 is a side elevation view of a preferred embodiment of the present invention incorporated in a typical automobile front door.

Referring now to FIG. 1 of the drawings, there is shown a preferred embodiment of the exterior decorative surround molding module generally shown at 20 attached to a vehicle door 22 of vehicle 23. The surround molding module, although described with reference to a vehicle door in the present application, can be utilized on a translational body side window. Further, it will be understood by those skilled in the art that the present invention may be incorporated in a partially flush or a fully flush window system.

Figure 2:
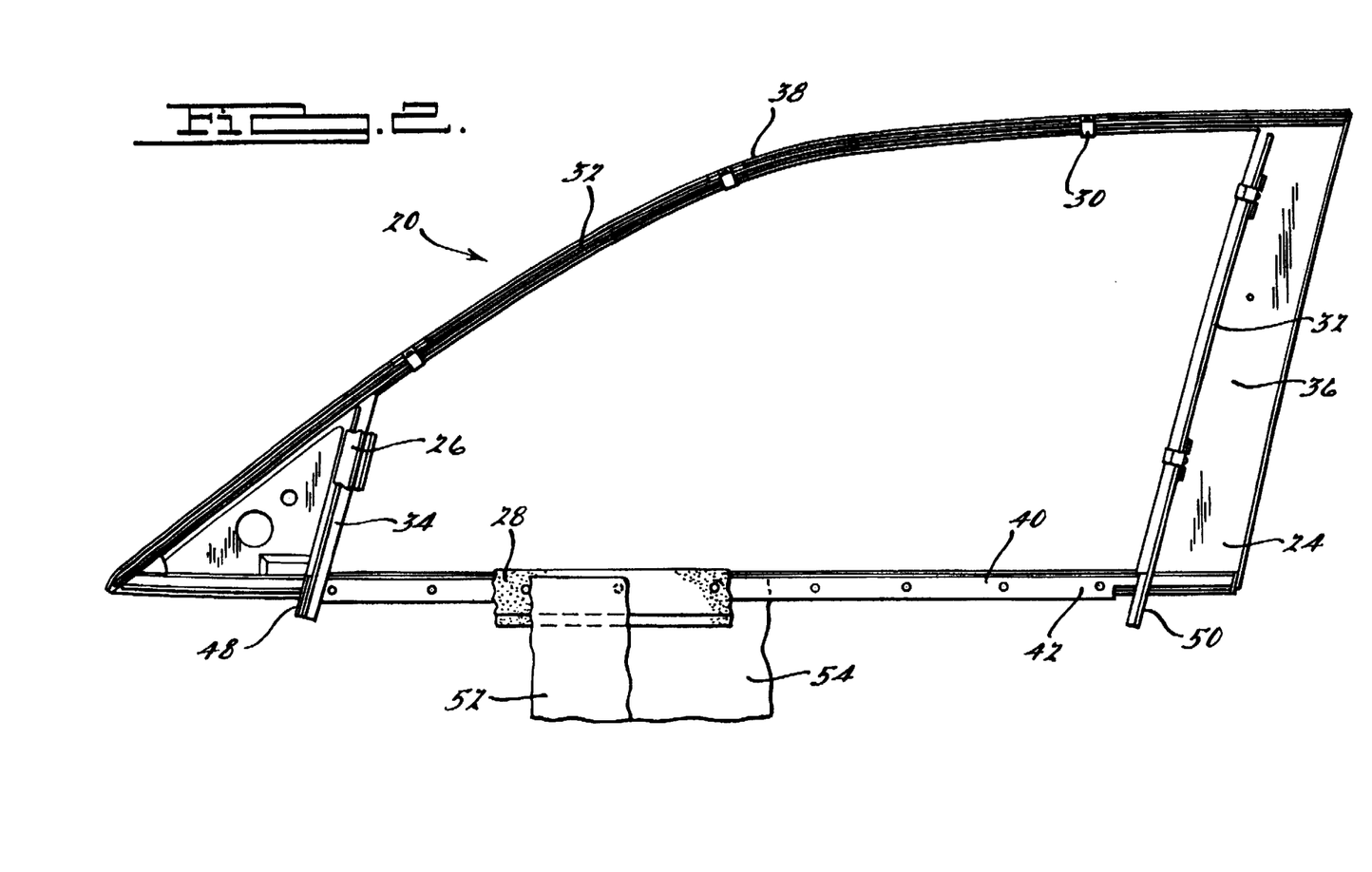
FIG. 2 is an elevation of a preferred embodiment of the present invention and the surrounding structure of the vehicle when viewed from the interior of the vehicle.

FIG. 2 shows the preferred embodiment of the surround molding module 20, viewed from the interior of vehicle 23, is composed of a molded one-piece surround molding 24, a glass run channel 26, a belt line outer seal 28, and a plurality of attachment clips 30. Surround molding 24 has an interior extending attachment flange 32 along a vertical forward edge 34, along a vertical rearward edge 36, and along a curved top edge 38. Along the lower edge or belt line 40 of surround molding 24 there is a downward extending flange 42 generally parallel to and spaced from the exterior surface 44 of surround molding 24 such that a channel 46 is created. (Best seen in FIG. 5). Channel 46 is configured to operably interface with vehicle door 22 such that surround molding 24 is securely positioned along belt line 40.

Further, surround molding 24 has two downwardly extending alignment tabs, 48 and 50, which extend attachment flange 32 below belt line 40. First alignment tab 48 is an extension of attachment flange 32 along forward edge 34, while second alignment tab 50 is an extension of attachment flange 32 along rearward edge 36. Alignment tabs 48 and 50 also function to coordinate module 20 with glass support channels (not shown) contained within vehicle door 22. Alignment and retention means (not shown) may be incorporated at the top of the glass support channels to secure alignment tabs 48 and 50 in a position which provides for smooth operation of the window as it translates between open and closed positions.

Figure 3:
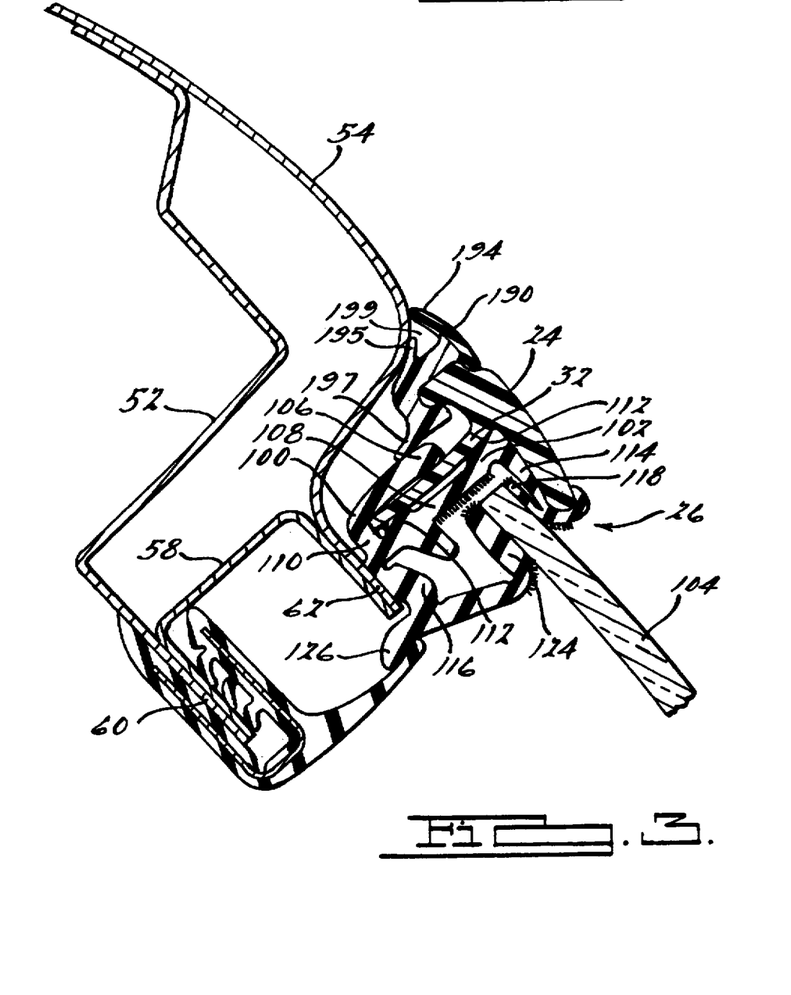
FIG. 3 is a sectional view taken along line 3—3 in FIG. 1.

Vehicle door 22 includes an interior structural member 52 and an exterior structural member 54. The terms interior and exterior, as well as inward and outward, in this application respectively refer to the interior occupant compartment and the exterior surface of a vehicle. Interior member 52 and exterior member 54 are attached to one another along the outer perimeter of door 22 by means which are commonly known. Further, interior member 52 and exterior member 54 may be directly joined to one another along portions of window aperture 56 or, as shown in FIG. 3, they may be joined with an intermediate structural member 58 attached between inner weld flange 60 of interior member 52 and outer weld flange 62 of exterior member 54. Interior member 52, intermediate member 58, and exterior member 54 are generally made of metal, such as steel, but can be formed from a number of composite materials which are commonly known and utilized in the industry, such as reinforced fiberglass or sheet-molded-compounds.

Figures 4, 5, 6:
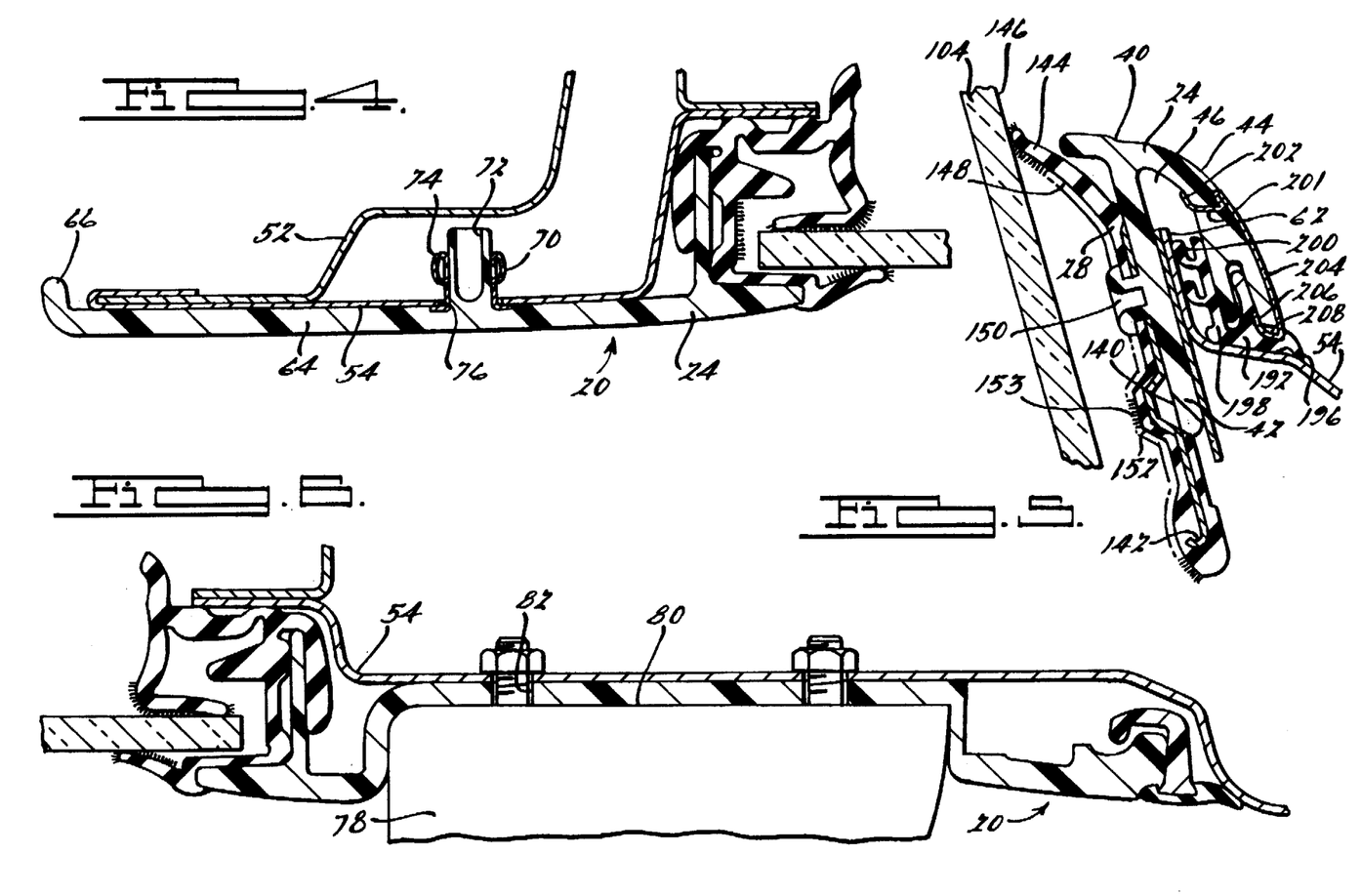
FIG. 4 is a sectional view taken along line 4—4 in FIG. 1.
FIG. 5 is a sectional view taken along line 5—5 in FIG. 1.
FIG. 6 is a sectional view taken along line 6—6 in FIG. 1.

FIG. 4 depicts a typical section of the present invention along a B pillar area of vehicle door 22. As shown, surround molding 24 includes an extended, rearwardly projecting portion 64 having an inwardly extending cover flange 66 at the rearmost edge. Cover flange 66 provides an improved aesthetic appearance when vehicle door 22 is in the closed position, provides improved structural integrity of rearwardly projecting portion 64, and reduces the probability of objects being forced between exterior member 54 and surround molding 24 which could damage surround molding module 20. Portion 64 may also include molded in attachments 70 for providing additional retention and improved durability of module 20. Attachment 70 may incorporate a molded in plastic boss 72 upon which is added a spring clip 74. Spring clip 74 is designed to fit a coordinated hole or slot 76 provided in exterior member 54. Alternate attachment methods, now known or later developed, which coordinate with the loading method of module 20, may also be provided without departing from the spirit and intent of the present invention.

Figure 7:
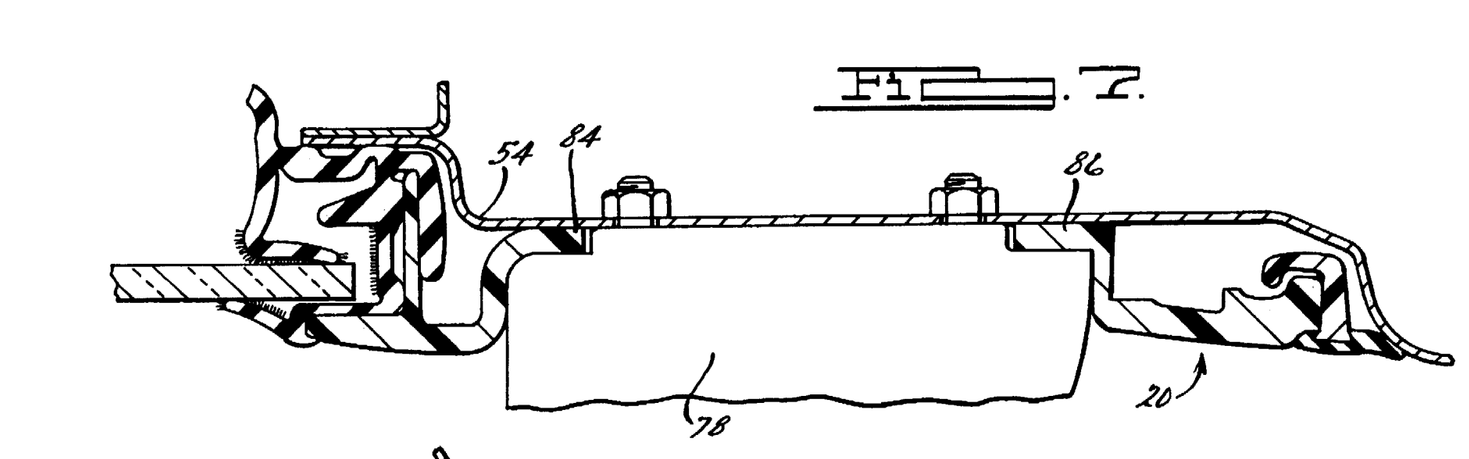
FIG. 7 is an alternate sectional view taken along line 6—6 in FIG. 1.

Referring now to FIGS. 6 and 7, there is shown typical sections through the forward edge of molding module 20 wherein an exterior rear view automotive mirror 78 is often positioned. Referring to FIG. 6, module 20 may provide a mounting surface 80 upon which the base of the exterior rear view mirror 78 rests, mounting surface 80 providing passages 82 allowing mirror 78 to be fastened to exterior member 54. Alternately, mounting surface 80 may be foreshortened, as indicated by flanges 84 and 86 in FIG. 7. In the alternate form, mirror 78 contacts flanges 84 and 86 while also directly contacting exterior member 54 and attaching thereto. In either case, the rear view mirror acts to retain the forward portion of module 20 against exterior member 54.

Figure 19:
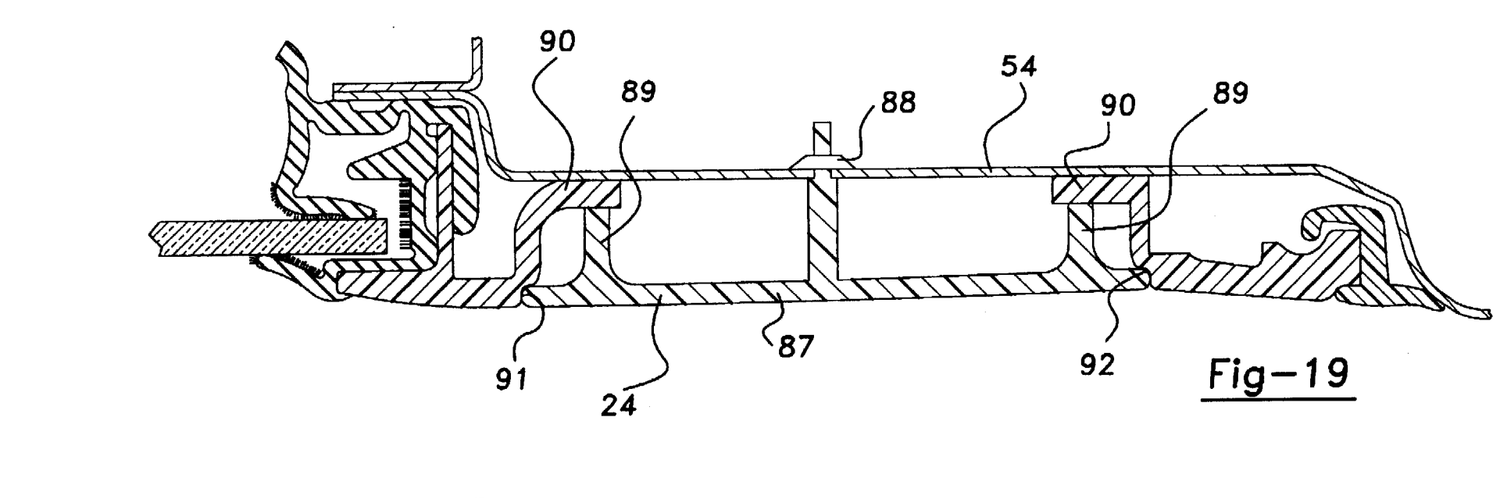
FIG. 19 is an alternate sectional view taken along line 6—6 in FIG. 1.
Figure 20:
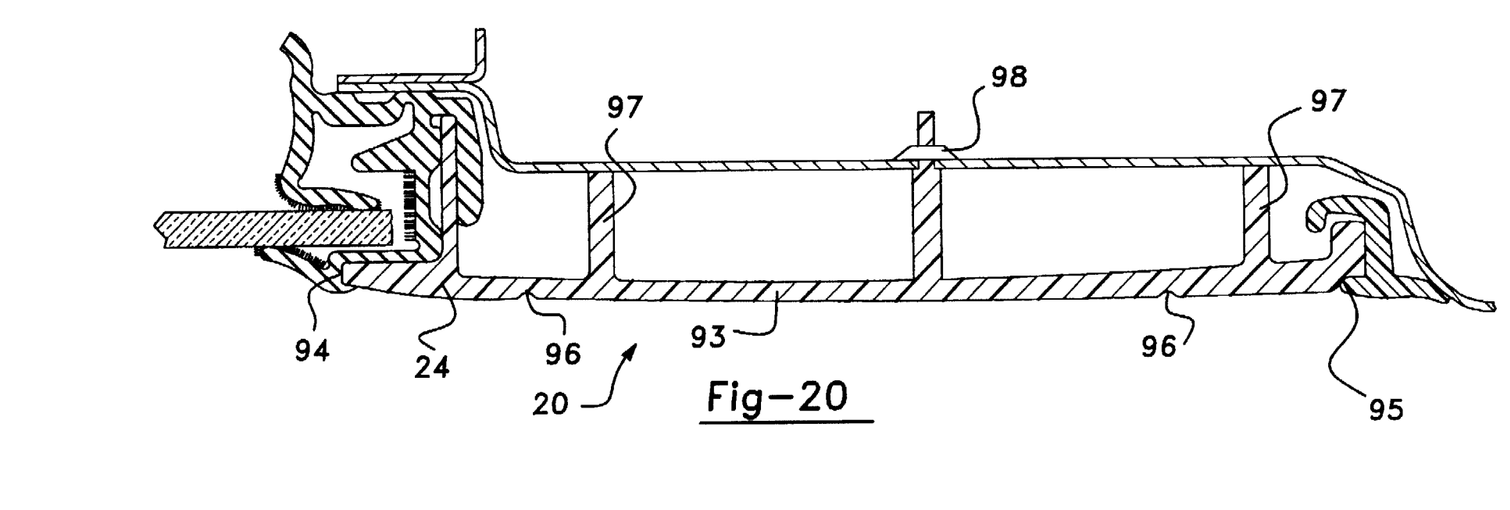
FIG. 20 is a further alternate sectional view taken along line 6—6 in FIG. 1.

If an exterior rear view mirror is not provided in this area, for example on the passenger side of a base model vehicle or when the mirror is mounted below the belt line area of the door, then surround molding module 20 provides alternate configurations as shown in FIG. 19 and FIG. 20.

As shown in FIG. 19, a sail applique 87 is fastened to exterior member 54 by a positive fastening means 88 including but not limited to: a push on retainer, a nut, a screw, a molded in snap feature, or similar attachment method. Sail applique 87 further includes inward extending members 89 which contact and retain flange 90 of surround molding 24. FIG. 19 further shows a rebate 91 in molding 24. Rebate 91 is generally the same depth as the material thickness of applique 87, and extends around the entire periphery of applique 87 thereby providing an aesthetically pleasing appearance and reducing possible wind noise. Sealing material 92 may be required along the interface between rebate 91 and applique 87 to prevent water leakage through any holes contained in exterior member 54.

FIG. 20 shows a further alternate embodiment of module 20 when a mirror is not offered or is mounted elsewhere. As shown, molding 24 incorporates a continuous surface 93 extending from a rear edge 94 to a forward edge 95 of molding 24. Character lines 96 may be incorporated to blend surface 93 into the remainder of molding 24. Interior extending members 97 provide support and structural integrity to surface 93. A fastening means 98 is also included which secures module 20 to exterior member 54. Fastening means 98 may include but is not limited to: a push on retainer, a nut, a screw, a molded in snap feature, or a similar attachment method.

Surround molding module 20 further includes glass run channel 26 as shown in FIGS. 3, 4, 6, and 7. With particular reference to FIG. 3, glass run channel 26 is shown to be comprised of a first U-shaped section 100 for attaching glass run channel 26 to attachment flange 32, and a second U-shaped section 102 for guiding and sealing window pane 104. First section 100 has an outer leg 106, an inner common leg 108, and an intermediate leg 110 positioned therebetween. Inner common leg 108 provides raised features 112 to position and retain glass run channel 26 relative to surround molding 24. Inner common leg 108 also acts as the intermediate leg of second U-shaped section 102 thereby joining exterior leg 114 and interior leg 116.

Exterior leg 114 includes an inwardly extending exterior glass sealing lip 118 at its distal end, sealing lip 118 having a low friction surface, such as flocking, to provide minimal resistance to window pane 104 as it translates along glass run channel 26. Further, an exterior retaining formation 120 is also formed on the distal end of lip 118, and is configured to wrap around the edge of surround molding 24.

Interior leg 116 includes an outwardly projecting interior glass sealing lip 124 at its distal end, lip 124 having a low friction surface, such as flocking, to provide minimal resistance to window pane 104 as it translates from an open to a closed position or vice versa. Leg 116 further includes an inwardly projecting insertion guide lip 126 which forces interior leg 116 to a proper position during loading of module 20 by contact between guide lip 126 and outer weld flange 62.

While glass run channel 26 is attached solely to surround molding 24, support is provided from surround molding 24 for exterior leg 114 and common leg 108, and from outer weld flange 62 for interior leg 116. Glass run channel 26 is preferably composed of elastomeric material having a durometer between 50 and 90 Shore A hardness. Further, no core member is required to properly retain channel 26 or to properly position interior and exterior legs 116 and 114, respectively.

While the glass run channel of the preferred embodiment is described as sealing on the interior and exterior surfaces of the window pane, the present invention can incorporate a glass run channel which provides sealing along the edge of the window pane. Similarly, the glass run channel of the present invention can provide sealing along the interior and exterior surfaces and along the edge of the window pane in a single glass run channel.

Referring now to FIG. 5, surround molding 24 is shown to be installed over outer weld flange 62, flange 42 being positioned inward of weld flange 62. Belt line outer seal 28 is attached to the interior surface 140 of flange 42, seal 28 extending along belt line 40 between alignment tabs 48 and 62. Belt line outer seal 28 is preferably comprised of elastomeric material having a durometer between 50 and 90 Shore A hardness, and is reinforced by a core member 142 positioned generally parallel to flange 42. A belt line seal lip 144 projects upwardly and inwardly such that its distal end contacts the exterior surface 146 of window pane 104. The interior surface 148 of seal 28 is provided with a low friction material, such as flocking, to minimize the resistance to translation of window pane 104. A plurality of molded in attachments 150 are positioned along interior surface 140 of flange 42 and retain seal 28 to surround molding 24. Methods of attachment typically include, but are not limited to, spin welding, hot-cold upset, or star washers over molded in studs.

Further shown in FIG. 5 is an outboard movement stop 152 which prevents window pane 104 from deflecting outward along belt line 40. Outward deflection can occur when the closure force exerted by the regulator, either manual or power, causes window pane 104 to "top out" against top edge 38 of surround molding 24. Since window pane 104 follows the inward curve above belt line 40 of molding 24, the dynamic tendency when such closure forces are encountered is for an outward deflection along belt line 40. Stop 152 is typically an inward projection formed in core member 142 and is covered with the same elastomeric material as the remainder of outer seal 28, as shown. However, stop 152 may also be a solid projection of elastomeric material either formed in the elastomeric material which covers core member 142 or a separate piece of solid elastomeric material attached to outer seal 28. Stop 152 may alternately be a hollow D seal attached to outer seal 28. Under any of the above described alternatives, it is to be understood that stop 152 may be a continuous formation extending the length of belt line 40, a single inward projection, or a plurality of inward projections spaced along belt line 40, depending upon the particular application. Further, stop 152 includes a low friction surface 153, such as flocking, to provide minimal resistance to window pane 104 as it translates between an open and a closed position.

Figure 8:
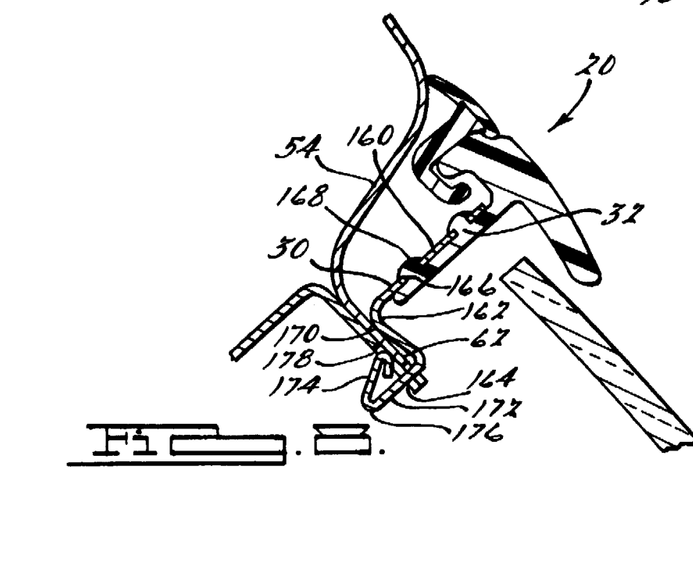
FIG. 8 is a sectional view taken along line 8—8 in FIG. 1.

With reference now to FIG. 8, attachment clip 30 is shown to be a spring clip fastened to attachment flange 32 at one or more locations. Clip 30 is typically made of spring steel but may be made of plastic material including that which molding 24 is made of. Further, attachment clip 30 may be integrally molded with molding 24, depending upon the material selected and the particular application, or clip 30 may be made of a dissimilar material and insert molded with molding 24. As shown in the preferred embodiment, clip 30 is comprised of an attachment portion 160, a seat portion 162, and a clip portion 164. Attachment portion 160 provides one or more holes 166 through which attachment bosses 168, molded in attachment flange 32, project and are peened over to retain clip 30 at a known position and in a secure fashion. Alternate forms of attachment, such as rivets, may also be utilized with equal effectiveness.

The seat portion 162 of clip 30 contacts outer weld flange 62 thereby positioning module 20 relative to weld flange 62 and providing a point of contact 170 against which clip portion 164 can act. Clip portion 164 is comprised of an inward projecting leg 172 and an outward extending leg 174 projecting from the interior end 176 of leg 172.

Figure 9:
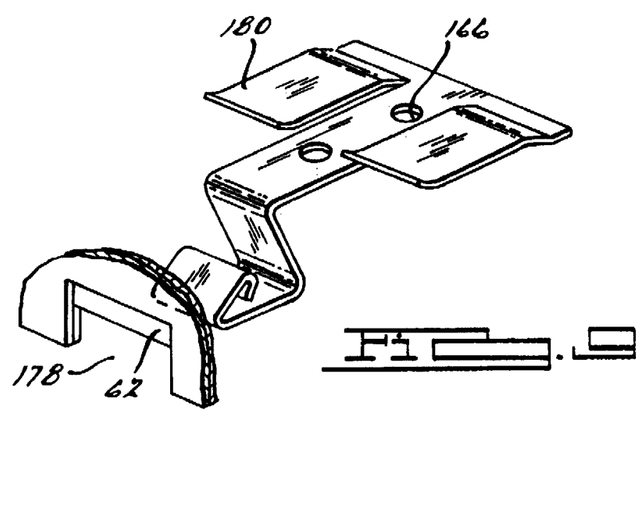
FIG. 9 is a perspective view of an alternate attachment clip having seal retaining provisions.

Referring to FIGS. 8 and 9 it is shown that coordinated with the location of each attachment clip 30 is a notch formation 178 in outer weld flange 62. While it is necessary to control the location and length of formations 178, the remainder of weld flange 62 is considered a non-critical dimension and the variation in length allowed can vary to a greater degree than with conventional glass run systems. This is advantageous since conventional glass run channels typically attach directly over weld flange 62 along their entire length and any variation in weld flange length can adversely affect the effectiveness of the seal and support provided by the conventional glass run channel.

Outer leg 106 of first U-shaped section 100 must locally be removed to provide contact between attachment flange 32 and attachment clip 30. As shown in FIG. 9, an alternate embodiment of attachment clip 30 provides retainers 180 to securely hold outer leg 106 around that portion which must be removed.

While the preferred embodiment is shown to incorporate a clip as a fastening means, it would be obvious to those skilled in the art that other fastening means may be utilized including, but not limited to: tape; adhesive solutions; positive retention devices such as screws or rivets; or chemical solvents if the door structure is a compatible material (e.g., plastic or sheet molded compound).

Figure 15:
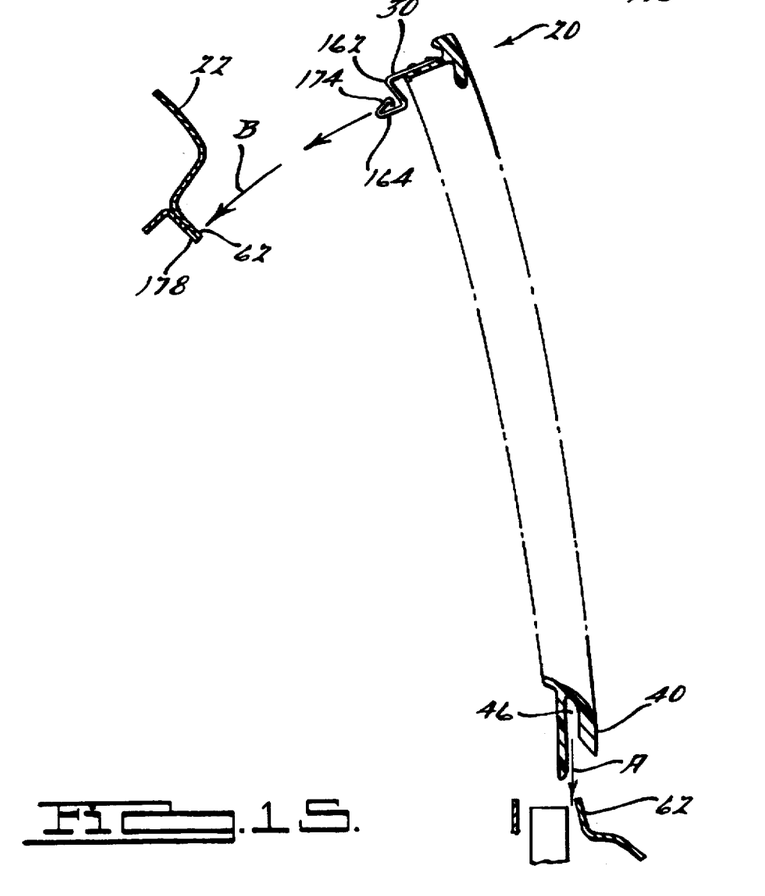
FIG. 15 is an exploded fragmented sectional view illustrative of an installation method of a preferred embodiment of the present invention.

FIG. 15 shows that in order to install module 20 into vehicle door 22 an assembly person, or operator, simply lowers channel 46 (positioned along belt line 40) over outer weld flange 62, as generally indicated by arrow A. Then, the operator rocks module 20, as indicated by arrow B, toward door 22 such that attachment clips 30 are aligned with notch formations 178 along weld flange 62. By applying pressure near the location of attachment clips 30, outward extending leg 174 of clip portion 164 flexes and is forced inward past weld flange 62 until seat portion 162 comes in contact with weld flange 62. Once leg 174 passes weld flange 62 it returns to a non-flexed position and traps weld flange 62 between leg 174 and seat portion 162.

While the preferred embodiment of the present invention is described with reference to loading the module from the exterior of the vehicle, loading the module of the present invention may be performed from the interior of the vehicle if the surrounding structure is designed to allow such loading.

To provide an improved seal between surround molding 24 and exterior member 54, thereby reducing wind noise and possible water leaks, gimp seals, 190 and 192, are provided. As best shown in FIGS. 3 and 5, outer gimp seal 190 and lower gimp seal 192 provide a pliable interface between molding 24 and exterior member 54. Outer gimp seal 190 is generally positioned along the top and forward edges of molding 24 where a lip portion 194 generally conforms to the surface contour of exterior member 54. Further included in outer gimp 190 are a water seal lip 195, and a retention lip 197. Water seal lip 195 creates an interior seal between exterior member 54 and outer gimp seal 190. Therefore, if water passes between lip portion 194 and exterior member 54 then it is trapped in a channel 199 and travels to either end of gimp seal 190 where the trapped water harmlessly exits to the exterior of vehicle 23. Retention lip 197 of gimp 190 provides additional retention forces to secure outer leg 106 of glass run channel 26 to attachment flange 32.

Lower gimp seal 192 also has a lip portion 196 which generally conforms to the surface contour of exterior member 54, and additionally provides an upstanding portion 198 having inward extending fingers 200 to improve the seal between and retention to outer weld flange 62 along the belt line 40 of molding 24.

Surround molding module 20 provides for a variety of aesthetic appearances in addition to providing structure for and attachment of glass run channel 26 and belt line outer seal 28 to door 22. Surround molding 24 may be plated (i.e., chrome plated) over its entire exterior surface, or over a portion of the exterior surface with the remaining portion being painted or covered with other decorative material. Surround molding 24 may further be left uncoated, thereby providing a black or other molded in color. Alternately, attachment locations may be provided within surround molding 24 such that a decorative applique, such as stainless steel, may be attached to portions of molding 24.

FIG. 5 shows a typical example where slots 201 are provided for tabs 202 formed in applique 204. An opposite side 206, from that having tabs 202, is wrapped around an edge 208 of molding 24. The prior list is intended to be illustrative and not a limit to the variety or combination of decorative finishes and surfaces which may be utilized in conjunction with surround molding module 20.

Figure 16:
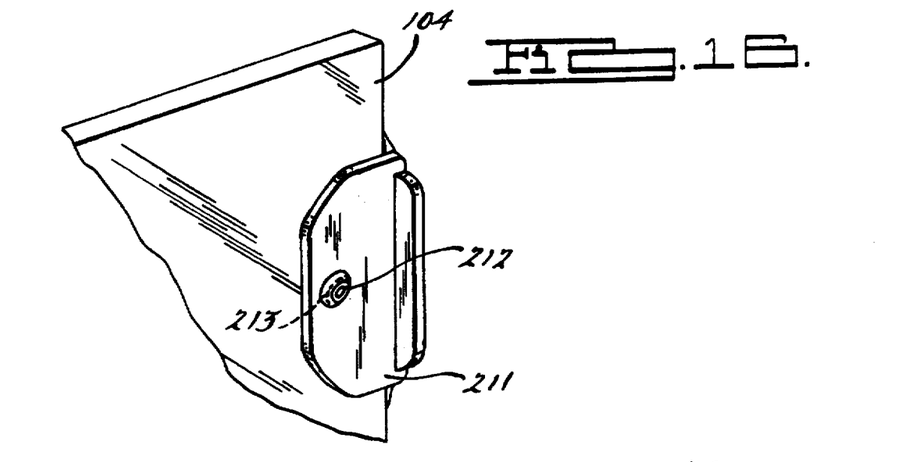
FIG. 16 is a perspective view of an alternate embodiment of the present invention.
Figure 17:
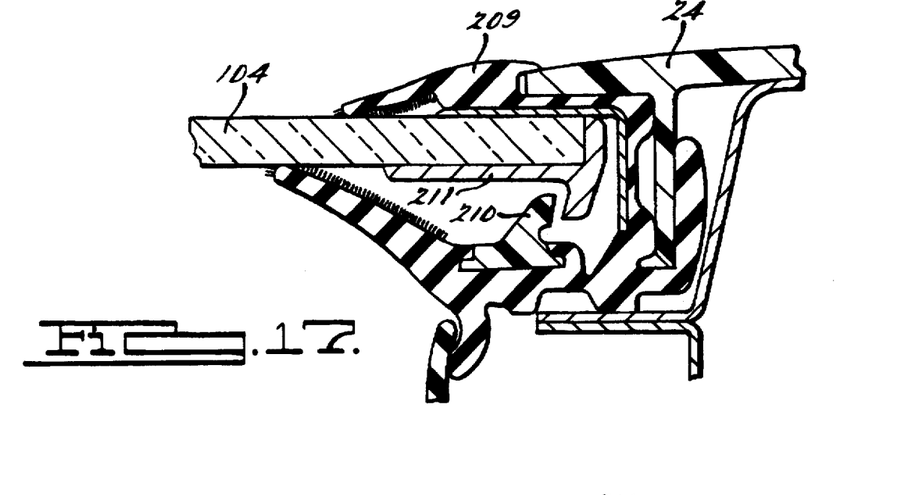
FIG. 17 is an alternate sectional view taken along line 4—4 in FIG. 1.
Figure 18:
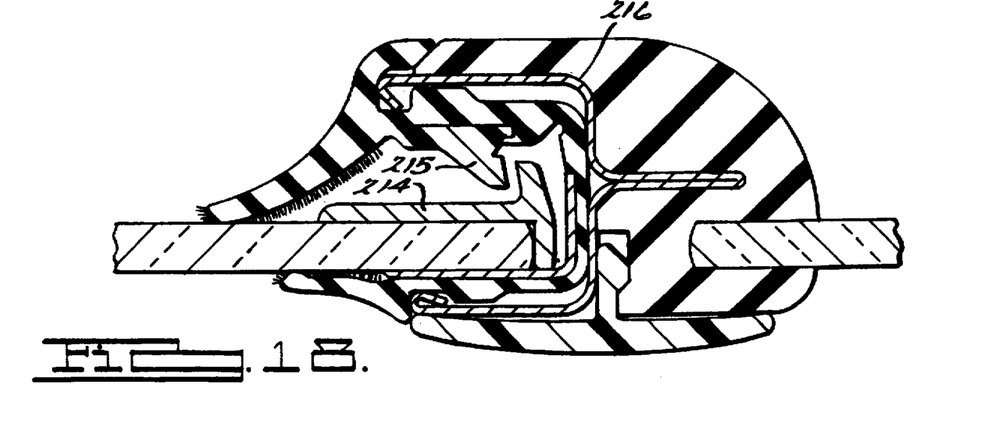
FIG. 18 is an alternate sectional view taken along line 11—11 in FIG. 1.

FIGS. 16, 17, and 18 show an additional preferred embodiment of the present invention. As shown, glass run channel 209 along the B Pillar or other vertical portion of surround molding 24 is provided with an integrally molded guide track 210. Guide track 210 is formed from a generally harder material (e.g., greater than 90 Shore A) than the remainder of glass run channel 209. Guide track 210 is configured to cooperate with a guide block 211 attached to window pane 104. Guide block 211 may be attached to window pane 104 by adhesives as shown in FIG. 17, tape, or by a positive retention pin 212 as shown in FIG. 16. Retention pin 212 passes through a hole 213 provided in window pane 104.

While installing window pane 104, guide block 211 is inserted into glass run channel 209 and snaps past guide track 210. Guide block 211 and coordinated guide track 210 provide support for window pane 104 as it translates between open and closed positions. As a result of this support, the window regulator (not shown) which traditionally must provide a rigid supporting structure may be reduced in size and weight, and may also require less structural support thereby reducing the number or size of brackets required within door 22.

Alternately, more than one guide block 211 may be utilized along a single vertical portion of surround molding 24. Two or more guide blocks may be spaced from one another and attached to window pane 104, thereby providing additional support if required. Further, multiple guide blocks may be utilized along opposite vertical portions (e.g., along vertical forward edge 34 and along vertical rearward edge 36) if glass run channel 209 provides a guide track 211 along each portion.

FIG. 18 shows that a guide block 214 and a guide track 215 may be incorporated along a vertical edge of a window pane in which a divider bar 216 is utilized. This feature will be further appreciated upon review of the following embodiment.

FIGS. 10 through 14 show an alternate preferred embodiment of the present invention in which an encapsulated, fixed glass assembly 218 is incorporated into an exterior decorative surround molding module 220. A rear side door on a sedan type automobile is an example of where a fixed glass assembly and a translational window pane may be utilized together. The rear portion of the rear side door window opening is often required to be fixed because, in order to allow for full travel of the window pane the lower, rear corner of the door would have to be relatively square. This is often difficult to accomplish since the rear wheel house often requires a forward facing radial contour at the lower, rear corner of the rear side door.

Figure 10:
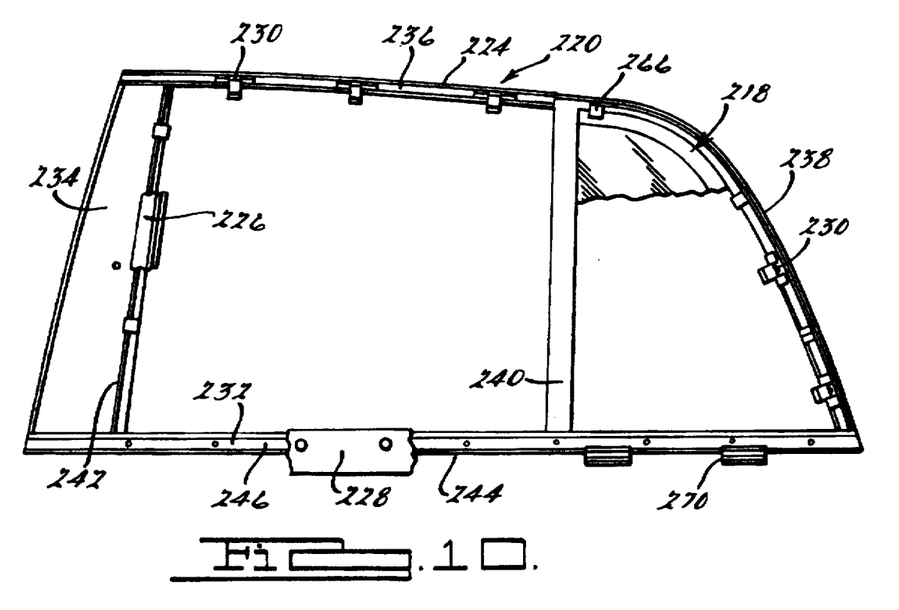
FIG. 10 is an elevation of an alternate embodiment of the present invention incorporating a fixed glass portion.

As shown in FIG. 10, module 220 is comprised of a molded one-piece surround molding 224, a glass run channel 226, a belt line outer seal 228, and a plurality of attachment clips 230 which attach module 220 to vehicle 23. Surround molding 224 has a belt line portion 232, a forward B pillar portion 234, a generally straight top portion 236, and a sloping or curved rear portion 238. Further, there is a generally vertical divider bar 240 positioned between B pillar portion 234 and rear portion 238. As in the first preferred embodiment, surround molding 224 has an interior extending attachment flange 242 along forward B pillar portion 234, top portion 236, and rear portion 238. Along the belt line portion 232 of surround molding 224 there is a downward extending flange 244 parallel to and spaced from the exterior surface 246 of surround molding 224 such that a channel 248 is created. (Best seen in FIG. 12).

Figure 11:
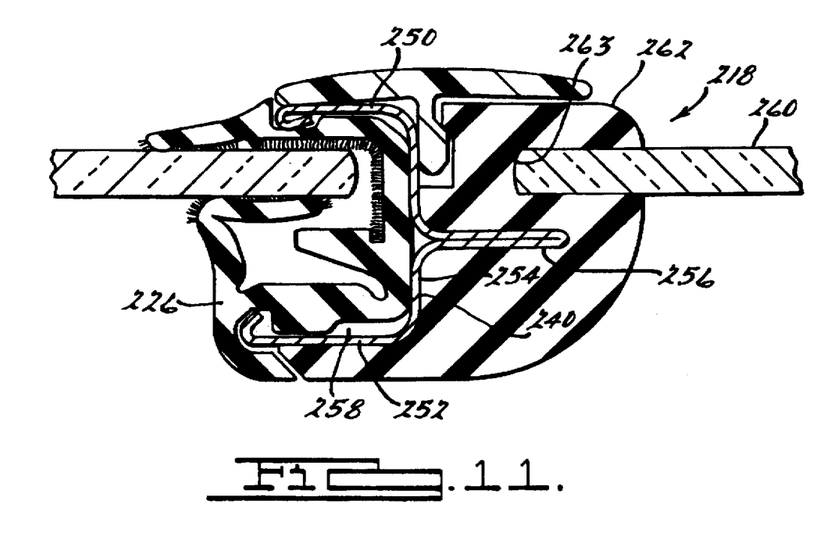
FIG. 11 is a sectional view taken along line 11—11 in FIG. 10.

As shown in FIG. 11, divider bar 240 is generally comprised of two forward facing legs, 250 and 252, which are parallel to and generally spaced from one another, an intermediate leg 254 connecting legs 250 and 252, and a rearward extending leg 256 attached to intermediate leg 254. Legs 250 and 252 form a channel 258 which supports and retains glass run channel 226.

Figure 12:
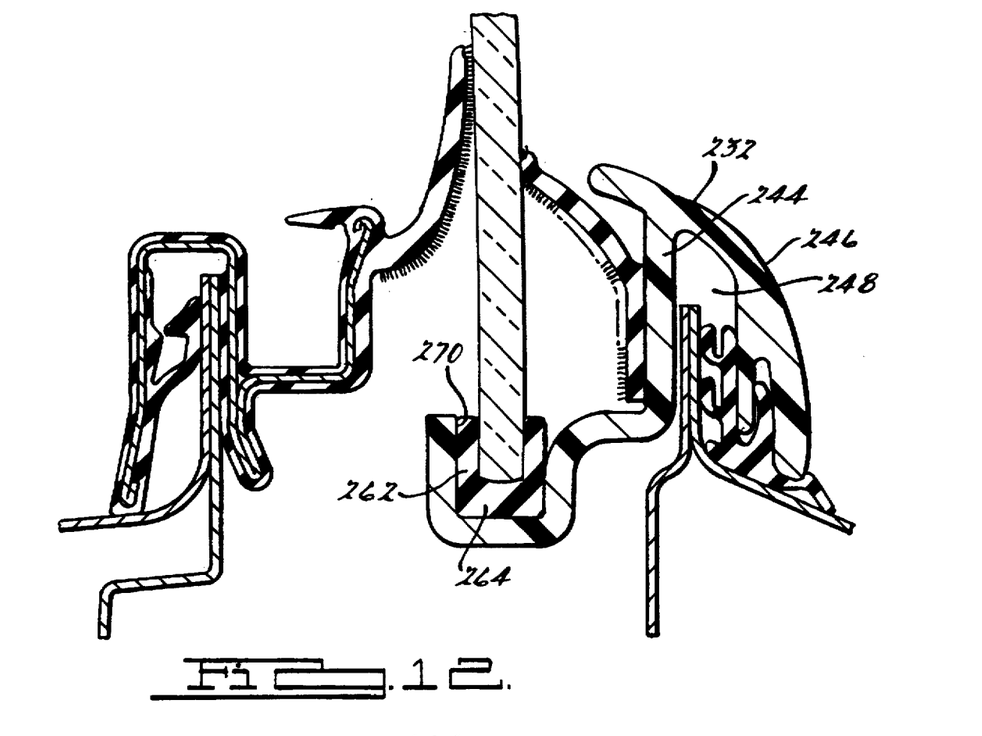
FIG. 12 is a sectional view taken along line 12—12 in FIG. 10.
Figure 13:
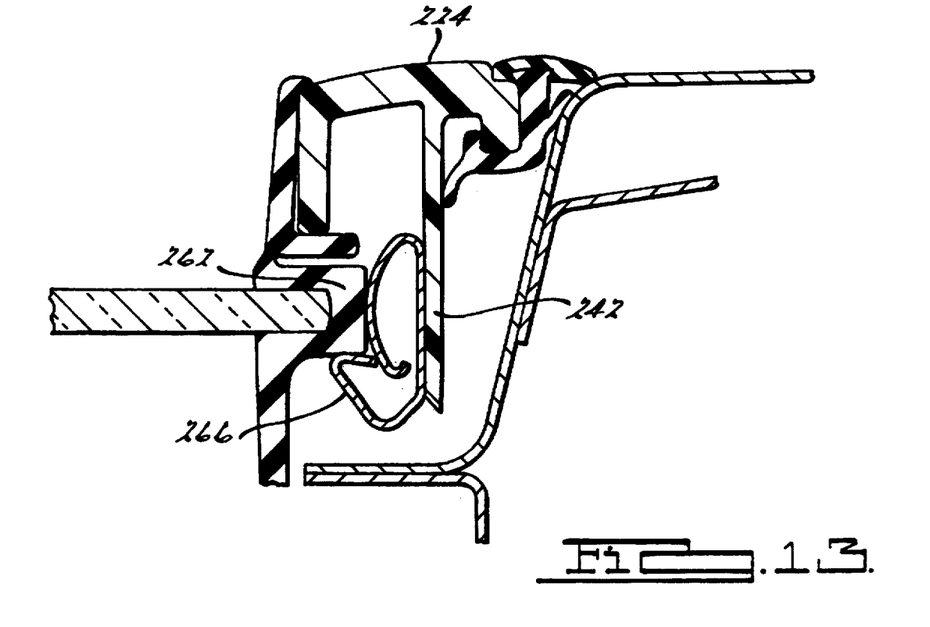
FIG. 13 is a sectional view taken along line 13—13 in FIG. 10.

Fixed glass assembly 218 is comprised of divider bar 240, a glass pane 260, and an annular elastomeric ring 262 which generally surrounds an outer edge 263 of glass pane 260 and has a durometer between 50 and 90 Shore A hardness. Elastomeric ring 262 has a generally rectangular formation 264 along belt line portion 232 (as shown in FIG. 12), is configured to coordinate with assembly retaining clips 266 fastened to attachment flange 242 of surround molding 224 (See FIG. 13) along rear portion 238 and part of top portion 236. Divider bar 240 is generally connected to elastomeric ring 262 by positioning divider bar 240 in a mold prior to injecting the elastomeric material which forms ring 262. This process is typically known as "insert molding". By insert molding bar 240 within ring 262, a bond is created between bar 240 and ring 262, as well as, a seal which prevents exterior conditions from contacting the occupant of the vehicle or the interior surfaces of the vehicle.

Module 220 is assembled, prior to being attached to the vehicle, by first attaching belt line outer seal 228 to the belt line portion 232 of molding 224. This attachment, like that in the first preferred embodiment, may be accomplished by many methods know in the art including but not limited to: providing a plurality of holes in belt line outer seal 228 and providing upstanding, molded in bosses in molding 224 which are peened over by spin welding, heat staking, hot-cold upset, or any other common method; or by riveting through belt line outer seal 228 and molding 224, each of which is provided with coordinating holes.

Attachment clips 230 are then secured to molding 224 by methods similar to those used in the first preferred embodiment, or those listed above regarding attachment of the belt line outer seal 228. Clips 230 may also be insert molded with molding 224 or may be integral with molding 224, depending upon the material selected and application of the module.

Assembly 218 is then attached to surround molding 224 by first inserting rectangular formation 264 in an upward facing channel 270 provided along belt line portion 232 of molding 224 rearward of divider bar 240 (best shown in FIG. 12). Divider bar 240 is then secured to molding 224, and finally, pressure is applied to assembly 218 in the proximity of assembly retaining clips 266 (shown if FIG. 13) which securely hold assembly 218 to molding 224 along rear portion 238 and that part of top portion 236 with which it may interface.

Once assembly 218 is attached to molding 224, glass run channel 226 is attached to interior extending attachment flange 242 along forward B pillar portion 234, and top portion 236. The glass run channel 226 is then inserted in channel 258, formed by legs 250 and 252, of divider bar 240.

Figure 14:
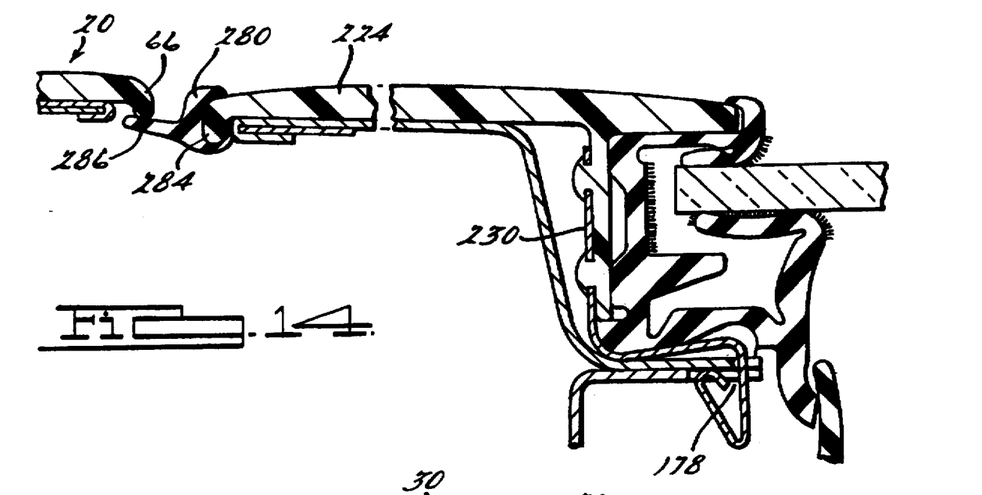
FIG. 14 is a sectional view taken along line 14—14 in FIG. 10.

Following the installation of all of the above components, module 220 is installed in and attached to a vehicle door or body side window opening in the same fashion as module 20 of the first preferred embodiment previously described. As shown in FIG. 14, attachment clips 230 are substantially the same as clips 30, and function in the same fashion. As such, clip 230 flexes over the notch 178 in outer weld flange 62 of vehicle 23 and retains the module 220 to vehicle 23.

With further reference to FIG. 14, there is shown a margin gimp seal 280. Margin gimp 280 is attached to the forward edge 284 of surround molding 224 and provides a forward extending margin lip 286 which contacts flange 66 of module 20 (if applicable) or a rearward edge of exterior member 54 if module 20 is not utilized in a particular application. Margin gimp seal 280 provides an improved aesthetic appearance and reduces water penetration and wind noise.

Figure 21:
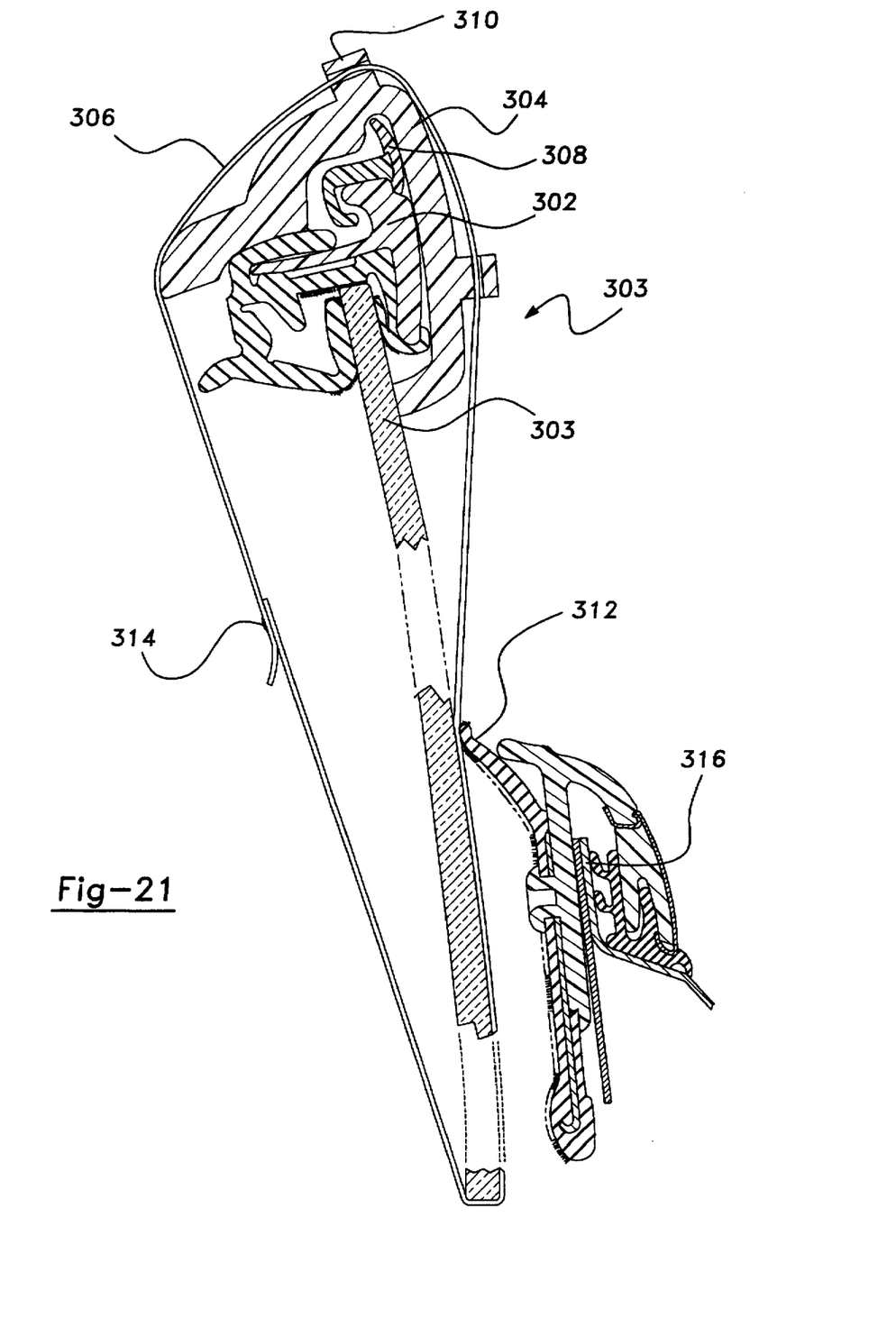
FIG. 21 is a sectional view of a window pane retention system, including a surround molding module made in accordance with the teachings of the present invention, allowing for the inclusion of a window pane in said module prior to installation at final assembly.

With reference to FIG. 21, while the prior embodiments of the present invention have been described as generally including the module alone (i.e., 20 and 220), it is within the spirit and scope of this disclosure that a window pane 300 be included in and assembled to a surround molding module 302 prior to installation during final assembly, thereby creating an assembly 303. As such, a system of securing window pane 300 within module 302 will now be described. For simplicity reference will be made to module 300 only; however, it will be understood by those skilled in the art that this system can be applied to modules including the elements of either 20 or 220 as previously described.

A window pane 300 is shown secured within surround molding module 302, thereby creating assembly 303, prior to installation during final assembly. Surround molding module 302 is made in accordance with the teachings of the present invention. Securing window pane 300 is at least one protector block 304 and at least one coordinated shipping band 306. Depending upon the application, more than one block 304 and band 306 combination may be required to properly secure window pane 300. Factors to be considered when determining the number of blocks and bands to be utilized include the size, weight, and balance of window pane 300 within module 302.

Protector block 304 is formed to both protect gimp seal 308 from being deformed by band 306 and to position window pane 300. Shipping band 306 passes over block 304 or through a tab 310 on block 304 as shown, proceeding between belt line seal 312 and window pane 300, and below window pane 300. Shipping band 306 is then attached to itself at attachment 314 in a fashion which provides sufficient tensile strength to support window pane 300 during handling, yet has a low shear strength at attachment 314, allowing an operator or assembly worker to easily release attachment 314. Shipping band 306 passes between seal 312 and window pane 300 such that assembly 303 may be lowered onto outer weld flange 316 for support prior to release of attachment 314. Therefore, the operator has a hand free to hold window pane 300 and lower it to the correct position for attachment to the regulator assembly (not shown). Alternately, window pane 300 may be held by block 304 and band 306 in a position appropriate for attachment prior to release of attachment 314. Once attachment 314 is released, block 304 is removed from module 302. Block 304 and band 306 are set aside and assembly 303 is installed as modules 20 and 220 were in the previously described embodiments.

The foregoing discussion discloses and describes exemplary embodiments of the present invention. One skilled in the art will readily recognize from such discussion, and from the accompanying drawings and claims that various changes, modifications, and variations can be made therein without departing from the true spirit and fair scope of the invention as defined in the following claims.

What is claimed is:

1. A decorative surround molding module for a vehicle having a window aperture for a translational glass pane, said window aperture having a perimeter, said module comprising:
   a one-piece surround molding generally defining said perimeter of said window aperture, said surround molding having a belt line portion;
   a glass run channel secured to said surround molding, said glass run channel guiding and supporting said translational glass pane;
   means for fastening said surround molding, wherein said fastening means attach said surround molding to a flange on said vehicle; and
   wherein said glass run channel is secured to said surround molding, said surround molding being secured to said flange on said vehicle.

2. The module of claim 1 further comprising:
   a belt line outer seal fastened to said belt line portion of said surround molding;
   one or more gimp seals attached to said surround molding such that said gimp seals contact said vehicle and said surround molding; and
   wherein said belt line outer seal contacts an exterior surface of said glass pane and provides a seal by such contact, and said gimp seals provide a seal between said surround molding and said vehicle.

3. The module of claim 1 wherein said glass run channel further comprises:
   a first U-shaped section having an outer leg, an intermediate leg, and an inner leg, said first U-shaped section securing said glass run channel to said surround molding;
   a second U-shaped section having an exterior leg, an intermediate leg, and an interior leg, said second U-shaped section guiding and supporting said window pane; and
   wherein said inner leg of said first U-shaped section and said intermediate leg of said second U-shaped section are a common wall.

4. The module of claim 1 further comprising:
   a guide block attached to said glass pane;
   said glass run channel having a guide track incorporated along one or more vertical portion of said glass run channel; and
   wherein said guide block and said guide track cooperate to provide retention of said glass pane.

5. The module of claim 3 wherein said surround molding is a thermo plastic molded component.

6. The module of claim 5 wherein at least a portion of said surround molding is coated with a decorative coating.

7. The module of claim 5 wherein said surround molding provides attachment locations for a decorative overlay, said overlay covering a portion of said surround molding thereby improving the aesthetic appearance thereof.

8. An exterior decorative surround molding module for a vehicle window having a translational glass pane, said module comprising:
   a one-piece molded surround molding fully surrounding the perimeter of a window aperture, said surround molding having an inner edge, an outer edge, and a belt line portion, said surround molding having an interior extending attachment flange along a top edge, and along one or more of a forward edge and a rear edge of said surround molding, said attachment flange being spaced from said inner edge of said surround molding and projecting generally perpendicular to said window aperture;
   a glass run channel secured to said attachment flange, said glass run channel guiding and supporting said translational window pane and providing a seal along a periphery of said window pane which contacts said glass run channel;
   a plurality of fasteners secured to said attachment flange of said surround molding and projecting toward said vehicle window such that said fasteners capture an outer weld flange of said vehicle, said weld flange generally defining said window aperture; and
   wherein said glass run channel is secured to said attachment flange of said surround molding prior to said surround molding being fastened to said vehicle window.

9. The module of claim 8 further comprising:
   a belt line outer seal fastened to said belt line portion of said surround molding;
   one or more gimp seals attached to said outer edge of said surround molding, said gimp seals contacting said vehicle and said surround molding; and
   wherein said belt line outer seal contacts an exterior surface of said window pane and provides a seal therebetween, and said gimp seals provide a seal between said surround molding and said vehicle.

10. The module of claim 8 further comprising:
    a guide block attached to said glass pane;
    said glass run channel having a guide track incorporated along one or more vertical portion of said glass run channel; and
    wherein said guide block and said guide track cooperate to provide retention of said glass pane.

11. The module of claim 8 wherein said glass run channel further comprises:

a first U-shaped section having an outer leg, an intermediate leg, and an inner leg, said first U-shaped section securing said glass run channel to said attachment flange of said surround molding;

a second U-shaped section having an exterior leg, an intermediate leg, and an interior leg, said second U-shaped section guiding and supporting said window pane; and wherein said inner leg of said first U-shaped section and said intermediate leg of said second U-shaped section are a common wall.

12. The module of claim 11 wherein said second U-shaped section exterior leg includes an exterior glass sealing lip to provide an exterior sealing contact with said exterior surface of said translational window pane.

13. The module of claim 12 wherein said exterior sealing lip further includes a low friction surface contacting said exterior surface of said translational window pane.

14. The module of claim 12 wherein said exterior sealing lip further includes an exterior retaining formation, said retaining formation operably associated with said inner edge of said surround molding.

15. The module of claim 11 wherein said second U-shaped section interior leg includes an interior sealing lip to provide an interior sealing contact with an interior surface of said translational window pane.

16. The module of claim 15 wherein said interior sealing lip further includes a low friction surface contacting said interior surface of said translational window pane.

17. The module of claim 11 wherein said common wall has a first side contacting said window pane, a second side contacting said attachment flange, and said first side of said common wall includes a low friction surface.

18. The module of claim 11 wherein said second U-shaped section interior leg includes a guide formation, said guide formation contacting said outer weld flange during installation of said module such that said glass run channel remains properly oriented relative to said window pane.

19. The module of claim 8 further comprising:

a fixed glass window portion having a fixed glass pane wherein said pane is encapsulated by a molded material about a perimeter of said fixed glass pane;

fastening means for attaching said fixed glass window portion to said surround molding prior to said surround molding being fastened to said vehicle;

a divider bar along a generally vertical edge of said fixed glass portion, said divider bar positioned between said fixed glass window pane and said translational glass pane, said divider bar providing support and attachment for said glass run channel along said generally vertical edge, and being operably associated with said molded material encapsulating said fixed glass pane.

20. The module of claim 19 wherein said divider bar comprises:

a first side having a pair of first flanges extending away from said fixed window pane, said first flanges being generally parallel to and spaced from one another such that said glass run channel is positioned and secured between said first flanges; and a second side having a second flange extending toward said fixed window pane, said second flange being connected to said molded material encapsulating said fixed glass pane.

21. A method for installing and attaching a glass run channel and surround molding to a vehicle having a window aperture for a translational glass pane, said method comprising:

providing a module having a one-piece surround molding fully surrounding said window aperture and having a belt line portion providing a channel, a glass run channel secured to said surround molding for guiding and supporting said translational glass pane, and a means for fastening said surround molding to said vehicle;

placing said belt line portion of said surround molding over a flange of said vehicle, said flange generally defining said window aperture, such that said flange is positioned within said channel provided in said belt line portion of said surround molding;

rotating said module toward said vehicle about a line created by contact between said flange and said channel of said belt line portion;

fastening said module to said vehicle using said fastening means of said module.

22. The method of claim 21 wherein said module further comprises:

a belt line outer seal fastened to said belt line portion of said surround molding;

one or more gimp seals attached to said surround molding such that said gimp seals contact said vehicle and said surround molding when said module is fastened to said vehicle thereby creating a seal therebetween.

23. The method of claim 21 wherein said module further comprises:

a guide block attached to said glass pane;

said glass run channel having a guide track incorporated along one or more vertical portions of said glass run channel; and wherein said guide block and said guide track cooperate to provide retention of said glass pane.

24. The method of claim 21 wherein said glass run channel of said module further comprises:

a first U-shaped section having an outer leg, an intermediate leg, and an inner leg, said first U-shaped section securing said glass run channel to said surround molding;

a second U-shaped section having an exterior leg, an intermediate leg, and an interior leg, said second U-shaped section guiding and supporting said window pane; and wherein said inner leg of said first U-shaped section and said intermediate leg of said second U-shaped section are a common wall.

* * * * *